United States Patent Office 3,406,745
Patented Oct. 22, 1968

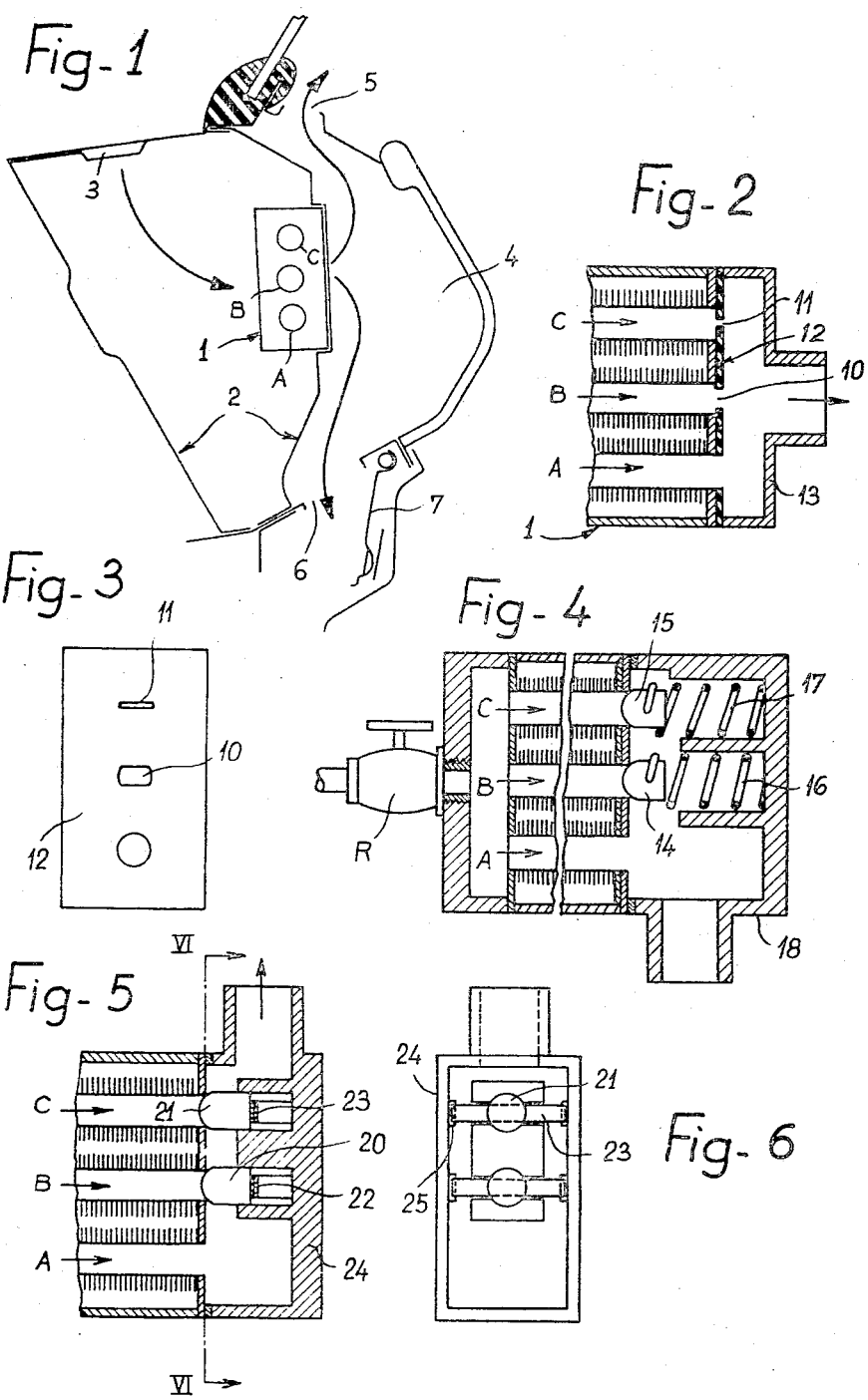

3,406,745
AIR HEATERS
Gaëtan de Coye de Castelet, Billancourt, France, assignor to Regie Nationale des Usines Renault, Billancourt, France
Filed Sept. 29, 1966, Ser. No. 583,026
Claims priority, application France, Oct. 22, 1965, 35,911
4 Claims. (Cl. 165—40)

ABSTRACT OF THE DISCLOSURE

An air heater having at least two circulation conduits for the heating fluid and a valve for regulating the rate of flow of fluid through these conduits. A variable control member is provided for the circulation of fluid in at least one conduit, particularly as a function of the rate of flow permitted by the valve, so as to obtain simultaneously with the quantitative regulation of the heating assured by means of the valve, a different distribution of the heating fluid in the different conduits of the air heater. Thus layers of air at different temperatures can be directed in different directions from the outlet of the heater.

---

The heating apparatus with fluid circulation are usually controlled by a system which constricts the rate of flow circulating in the apparatus.

The regulation of the temperature necessary for obtaining an agreeable ambient atmosphere is effected by means of this flow control, it being difficult to obtain the progressive nature of this flow.

As a function of the fluid rates of flow, there is obtained a distribution of air temperatures flowing through the heating apparatus, this distribution being more or less homogeneous, depending on the forms of the apparatus.

On the other hand, in an automobile vehicle, there is always the physiological necessity of having air which is hotter at the feet than at the head, this difference being all the more necessary as a lesser degree of heating is desired.

This result is obtained at present by using, concurrently with the heating, a supply of fresh air which may or may not be mixed with the hot air, the control being effected by special dampers.

The invention resolves this problem by making it possible to obtain the desired result in a more simple and economical manner, and particularly while no longer using a separate source of fresh air. Applied to an automobile vehicle, the invention more particularly makes it possible to obtain at the outlet from the heating apparatus, and depending on requirements, layers of fresher air in the upper parts than in the lower parts, and this while normally directing the air leaving the upper parts of the apparatus towards the heads and the air leaving the lower parts towards the feet of the passengers.

The invention can also be satisfactorily applied just as well to a long air heater as to a conventional air heater, the only necessary condition being that the number of conduits extending through the air heater is greater than or equal to 2.

Essentially, the air heater according to the invention, comprises at least two conduits for circulation of heating fluid and a valve controlling the rate of flow of the fluid admitted through these conduits, is characterised in that, for at least one conduit, there is provided a variable control member for the circulation of the fluid in this particular conduit as a function of the rate of flow permitted by the valve, so as to obtain, at the same time as the quantitative regulation of the heating ensured by means of the valve, a different distribution of the heating fluid in the different conduits of the air heater. Thus, in the main application of the invention as indicated above, it is possible to obtain a predetermined temperature gradient for the air flowing through the air heater, the air flowing along the conduits with a high fluid flow (low conduits) being hotter than the air flowing along the conduits with a small fluid flow (upper conduits).

In particular, the said control member can thus be a throttling member, a valve opening for a predetermined pressure difference or a temperature-sensitive control obturator.

Embodiments of air heaters according to the invention are hereinafter described by way of example and by reference to the accompanying drawing, in which:

FIGURE 1 is a diagrammatic view as a transverse section of an air-conditioning installation in a vehicle, comprising an air heater of the type to which the invention is applicable;

FIGURE 2 is an axial section of one of the ends of the air heater provided with throttling members;

FIGURE 3 is a detail view of a part of FIGURE 2;

FIGURE 4 is another axial section of one end of an air heater provided with valves;

FIGURE 5 is another axial section of an end of the air heater, provided with temperature-sensitive obturator members;

FIGURE 6 is a detail view on the line VI—VI of FIGURE 5.

The air-conditioning installation of the vehicle as shown in FIGURE 1 is to be considered only as one example as regards the location of the air heater 1 and for illustrating its purpose within the scope of the invention, which is concerned with the control and proper functioning of said heater.

This installation comprises, mounted below and behind the windscreen on the body of the vehicle, a composite hollow cross-member, which is indicated as a whole by the reference 2 and of which the upper part has air inlet openings 3 which are open to the atmosphere. This cross-member forms an air admission compartment separated by the air heater 1 from an air distribution compartment 4 inside the vehicle. This air heater comprises a plurality of circulation conduits for the heating fluid, which are indicated herein by A, B and C, at different levels in the air passage to the air heater. The compartment 4 has upper openings 5 at the base of the windscreen, for the de-misting and de-frosting of the latter or the ventilation, and the lower openings 6 with an adjustable damper 7 and a diffuser directed towards the floor of the vehicle.

Such an installation is suitable for the following uses:

One use for ventilation purposes, when the circulation of the heating fluid is closed in the conduits A, B and C;

Various uses for heating and ventilation, depending on the conduits which are open to the circulation, and particularly, assuming the damper 7 to be open, the following conventional uses:

(a) Conduit A open and conduits B–C closed (hot air to the feet and fresh air to the head)

(b) Conduits A and B open and conduit C closed (hot air to the feet and warm air to the head)

(c) Conduits A, B and C open (general heating with de-misting or de-frosting, as the case may be).

As already stated, the arrangement according to the invention makes it possible to obtain these particular conditions of use and all intermediate conditions by the single operation of the usual valve (not shown in FIGURE 1) positioned in the supply channel of the conduits A, B and C of the air heater using heating fluid (see FIGURE 4—valve R).

According to the arrangement illustrated in FIGURES 2 and 3, constrictions or throttle devices 10 and 11 are provided at the outlet of the conduits B and C, the said constriction 11 being of smaller section than the constriction 10. These constrictions are here formed as slots in a plate 12 of elastomeric material connected at the ends of the conduits and serving at the same time as a joint between the casing of the air heater and a cap 13 forming a fluid discharge header.

According to the embodiment illustrated in FIGURE 4, valves 14 and 15 having calibrated springs 16 and 17 are provided at the outlet of the conduits B and C, in such a way that the valve 15 is only opened for a difference in pressure greater than that at which the valve 14 is opened, the springs in this case being fitted and guided in the cap 18 forming the fluid outlet header.

According to the constructional form illustrated in FIGURES 5 and 6, obturator members 20, 21 are provided at the outlet ends of the conduits B and C of the air heater, the opening of said members being controlled by bimetallic strips 22 and 23 fitted in the cap 24 forming the fluid outlet header, in which they bear against shoulders 25 shown in FIGURE 6. These bimetallic strips are sensitive to the temperature of the fluid flowing through the cap and are so chosen that the obturator member 21 is only opened for a temperature higher than that for which the obturator member 20 is opened. With all these constructional forms:

A first opening zone of the supply valve will make it possible to obtain the function previously mentioned under (a) (circulation of fluid only in the conduit A, or preferentially in this conduit for the embodiments of FIGURES 2 and 3);

A second opening zone of the said valve will permit of obtaining the function mentioned in (b) (circulation of fluid only in the conduits A and B, or preferentially in these conduits in the case of FIGURES 2 and 3);

A third opening zone of the said valve will permit of obtaining the function mentioned in (c), i.e., an appreciable fluid circulation simultaneously in the conduits A, B and C.

It will be noted that, within the scope of the invention, the valves and obturator members can be arranged in such a manner as to be of the progressive opening type or even of the "all or nothing" instantaneous operation type, it also being possible to provide for the control thereof by an action effected outside the air heater.

I claim:

1. An air heater comprising at least two circulation conduits for heating fluid, valve means operatively connected to regulate the rate of fluid flow through said conduits, variable control means controlling the circulation of fluid through at least one conduit as a function of the rate of flow permitted by said valve, distributor means having at least two spaced outlets whereby layers of air at different temperatures can be directed out of said heater in different directions.

2. An air heater according to claim 1 wherein said variable control means comprises a constricting member throttling fluid flow therethrough.

3. An air heater according to claim 1 wherein said variable control member comprises a pressure responsive valve means.

4. An air heater according to claim 1 wherein said variable control member comprises temperature responsive obturator means.

References Cited

UNITED STATES PATENTS

| 2,070,427 | 2/1937 | Faunce | 165—174 |
| 3,047,274 | 7/1962 | Wilson | 165—39 |
| 3,073,575 | 1/1963 | Schulenberg | 165—174 |
| 3,195,622 | 7/1965 | Haufler et al. | 165—101 |

FOREIGN PATENTS 257,593  8/1926  Great Britain.

ROBERT A. O'LEARY, *Primary Examiner.*

C. SUKALO, *Assistant Examiner.*